2,946,827
PRODUCTION OF FLUOROFORM

Leon Jerzy Belf, Bristol, England, assignor to The National Smelting Company Limited, London, England No Drawing. Filed Dec. 18, 1957, Ser. No. 703,507

Claims priority, application Great Britain Jan. 14, 1957

2 Claims. (Cl. 260—653.7)

This invention relates to the production of fluoroform.

It is known from British Patent No. 428,445 that when a mixture of hydrogen fluoride and chloroform is passed over charcoal at 300° C., partial fluorination of the chloroform occurs. In an example it is stated that the halogenated hydrocarbons produced consisted of 10% chlorodifluoromethane, 60% fluorodichloromethane, and 30% chloroform.

The present invention consists of a method of preparing fluoroform in which a gaseous mixture of chloroform and hydrogen fluoride is passed over a catalyst consisting of active carbon impregnated with iron chloride at a temperature between 200° C. and 400° C. and the fluoroform produced is separated from the remaining products in a suitable manner.

In our experiments, using an activated charcoal material (Sutcliffe Speakman 206B) without any addition of iron chloride, the following were the compositions of the mixtures of halomethanes obtained with a contact time of 30 seconds. The results for 300° C. and 350° C. are the average for 5 and 3 experiments respectively.

|  | Run at 300° C. | | Run at 350° C. | |
|---|---|---|---|---|
|  | Wt. percent | Molar Composition | Wt. percent | Molar Composition |
| $CHF_3$ | 0.5 | 0.7 | 4.4 | 6.1 |
| $CHClF_2$ | 22.9 | 26.6 | 40.5 | 44.9 |
| $CHCl_2F$ | 62.1 | 60.6 | 37.4 | 34.8 |
| $CHCl_3$ | 11.9 | 10.0 | 11.3 | 9.1 |
| $CCl_2F_2$ | 0.9 | 0.7 | 3.7 | 3.0 |
| $CCl_3F$ | 1.4 | 1.0 | 2.3 | 1.6 |
| $CH_2Cl_2$ | 0.3 | 0.4 | 0.4 | 0.5 |

In the runs at 300° C. an average of 43% of the hydrogen fluoride remained unreacted; at 350° C. 33% of the hydrogen fluoride used remained unreacted.

With a similar carbon catalyst to which 10.7% iron had been added as ferric chloride the following were the molar compositions of the mixtures of halomethanes obtained.

|  | Run 1 (300°C.) | Run 2 (300°C.) | Run 3 (300°C.) | Run 4 (300°C.) | Average of Runs 1-4 (300°C.) | Run 5 (350°C.) |
|---|---|---|---|---|---|---|
| $CHF_3$ | 46.7 | 44.9 | 46.15 | 44.8 | 45.65 | 59.5 |
| $CHClF_2$ | 32.0 | 31.1 | 33.3 | 32.8 | 32.3 | 13.6 |
| $CHCl_2F$ | 6.9 | 7.6 | 7.0 | 7.5 | 7.3 | 5.1 |
| $CHCl_3$ | 11.9 | 14.3 | 12.1 | 13.45 | 12.9 | 15.25 |
| $CCl_2F_2$ | 1.75 | 1.6 | 1.2 | 1.2 | 1.4 | 6.3 |
| $CH_2Cl_2$ | 0.75 | 0.5 | 0.25 | 0.25 | 0.45 | 0.25 |

At 300° C. 7% of the hydrogen fluoride used remained unreacted; at 350° C. 2% of the hydrogen fluoride remained unreacted.

From these results it can be seen that our results with a carbon catalyst without iron chloride are broadly in agreement with those reported in British Patent No. 428,445; the main products are chlorodifluoromethane and fluorodichloromethane, together with unreacted chloroform; the patent did not report any fluoroform and we found it only in small amounts. With iron chloride added, however, we obtained fluoroform as the main product.

The chloroform/HF mole ratio in the runs was between 1:2.25 and 1:2.3.

In additional experiments the catalyst was an activated charcoal material as before, but impregnated with 12.7% iron instead of 10.7%. Runs were carried out at 300° C. with a chloroform/HF input ratio of 1:2.8, and at 350° C. with an input ratio of 1:2.9. The results, expressed as molar compositions, were as follows:

|  | Runs at 300°C. | | Runs at 350°C. | |
|---|---|---|---|---|
| $CHF_3$ | 70.2 | 67.6 | 83.05 | 87.0 |
| $CHClF_2$ | 22.2 | 25.6 | 7.85 | 7.5 |
| $CHCl_2F$ | 3.4 | 3.0 | 2.2 | 1.4 |
| $CHCl_3$ | 3.2 | 3.2 | 2.5 |  |
| $CCl_2F_2$ | 1.0 | 0.6 | 4.4 | 2.4 |
| $CCl_3F$ |  |  |  |  |
| $CH_2Cl_2$ |  |  |  | 1.7 |

These runs at 300° C. are satisfactory both in the fairly high yield of fluoroform and the low yield of tetrahalomethanes. The primary fluoroform yield is higher from the runs at 350° C. but undesired side reactions produce more tetrahalomethane and tend to produce methylene chloride.

Conveniently fluorodichloromethane and chloridifluoromethane produced as by-products are re-circulated with fresh chloroform and hydrogen fluoride.

A mixture of HF with chloroform and recirculated fluorodichloromethane and chlorodifluoromethane was passed over a carbon catalyst impregnated with ferric chloride at 300° C. The composition of the reactants and products is shown below:

|  | Molar Input |  | Molar Composition of product |
|---|---|---|---|
| HF | 234.7 | $CHF_3$ | 85.4 |
| $CHClF_2$ | 29.9 | $CHClF_2$ | 11.3 |
| $CHCl_2F$ | 5.7 | $CHCl_2F$ | 1.2 |
| $CHCl_3$ | 64.4 | $CHCl_3$ | 0.9 |
|  |  | $CCl_2F_2$ |  |
|  |  | $CH_2Cl_2$ | 0.6 |

This illustrates that the recirculation of the chlorine-containing trihalomethanes obtained from previous runs is satisfactory in that a high yield of $CHF_3$ is obtained with small percentages of trihalomethanes usable for recirculation, and very small amounts of undesired di- and tetrahalomethanes produced.

Conveniently also the catalytic reaction is carried out in two stages, the second stage being at a higher temperature than the first within the range 200–400° C.

A preferred method of operating is to pass a mixture of hydrogen fluoride with chloroform and recirculated fluorodichloromethane and chlorodifluoromethane over a carbon catalyst which is impregnated with an iron halide at a temperature between 200° C. and 400° C., say, 250° C. and thereby obtain a mixture of products but with fluorodichloromethane an important component, and then to pass these products over an iron-impregnated carbon catalyst at some higher temperature, say 350° C., and thereby obtain a gaseous product low in unreacted hydrogen fluoride and with fluoroform as the main component. This gaseous mixture is then washed with water to remove hydrogen chloride and hydrogen fluoride. The residual gases are then dried and condensed. The condensate is fractionally distilled to isolate the fluoroform. The fluorodichloromethane and the chlorodifluoromethane are returned to the first reaction stage, as already mentioned.

Various modifications may be made within the scope of the invention.

I claim:

1. The method of preparing fluoroform in high yield, which comprises passing a gaseous mixture of chloroform and hydrogen fluoride at a temperature between about 200° C. and 400° C. over a catalyst consisting essentially of active charcoal impregnated with from about 10.7% to 12.7% iron chloride, and thereafter separating the fluoroform from the remaining products.

2. The method of claim 1 in which the catalytic reaction is carried out in two stages within said temperature range and the second stage is carried out at a higher temperature than the first.

References Cited in the file of this patent

UNITED STATES PATENTS

| 2,005,707 | Daudt et al. | June 18, 1935 |
| 2,450,414 | Benning | Oct. 5, 1948 |

FOREIGN PATENTS

| 640,486 | Great Britain | July 19, 1950 |